United States Patent [19]

Smith

[11] 4,260,979
[45] Apr. 7, 1981

[54] APPARATUS FOR SENSING NON-CODED IMAGES

[75] Inventor: Robert C. Smith, Austin, Tex.

[73] Assignee: International Business Machines Corporation, Armonk, N.Y.

[21] Appl. No.: 108,439

[22] Filed: Dec. 31, 1979

[51] Int. Cl.³ .............................................. G06K 9/00
[52] U.S. Cl. ............................ 340/146.3 H; 235/472; 340/146.3 SY
[58] Field of Search ................. 358/101; 340/146.3 Z, 340/146.3 SY, 146.3 H, 146.3 R, 146.3 F, 146.3 MA; 235/472; 250/556, 557, 559, 216

[56] References Cited

U.S. PATENT DOCUMENTS

| | | | |
|---|---|---|---|
| 3,327,584 | 6/1967 | Kissinger | 340/146.3 SY |
| 3,701,098 | 10/1972 | Acker | 340/146.3 Z |
| 3,744,025 | 7/1973 | Bilgutay | 340/146.3 Z |
| 3,903,363 | 9/1975 | Montone et al. | 358/101 |
| 3,918,028 | 11/1975 | Humphrey et al. | 235/472 |
| 3,959,625 | 5/1976 | Kashio | 340/146.3 Z |
| 3,963,901 | 6/1976 | Gevas | 235/472 |
| 3,976,973 | 8/1976 | Martin et al. | 340/146.3 F |
| 4,048,617 | 9/1977 | Neff | 340/146.3 SY |
| 4,074,114 | 2/1978 | Dobras | 340/146.3 Z |

Primary Examiner—Leo H. Boudreau
Attorney, Agent, or Firm—J. B. Kraft

[57] ABSTRACT

Scanning apparatus is provided for sensing non-coded images on a substrate. Hand-held scanning apparatus comprises a group of light sensitive elements for sensing the light and dark pattern of the image as the scanner is moved across the substrate and means for sensing the velocity of the scanner.

The velocity determination is carried out through sensing means which comprise an X-Y coordinate grid positioned between the scanner and the substrate, means for sensing the rectilinear component of movement of two positions on said scanner with respect to the X lines in said grid together with the means for sensing the rectilinear component with at least one position on said scanner with respect to the Y lines on said grid. With this capability of calculating the rectilinear components of three such points or positions, the velocity of a given movement of the scanner in the X-Y and θ (rotational) directions may be determined. In this manner, the scanner is able to sense lines of the image relative to the velocity of movement of the hand-held scanner which is all that is necessary to record and reproduce the image.

14 Claims, 13 Drawing Figures

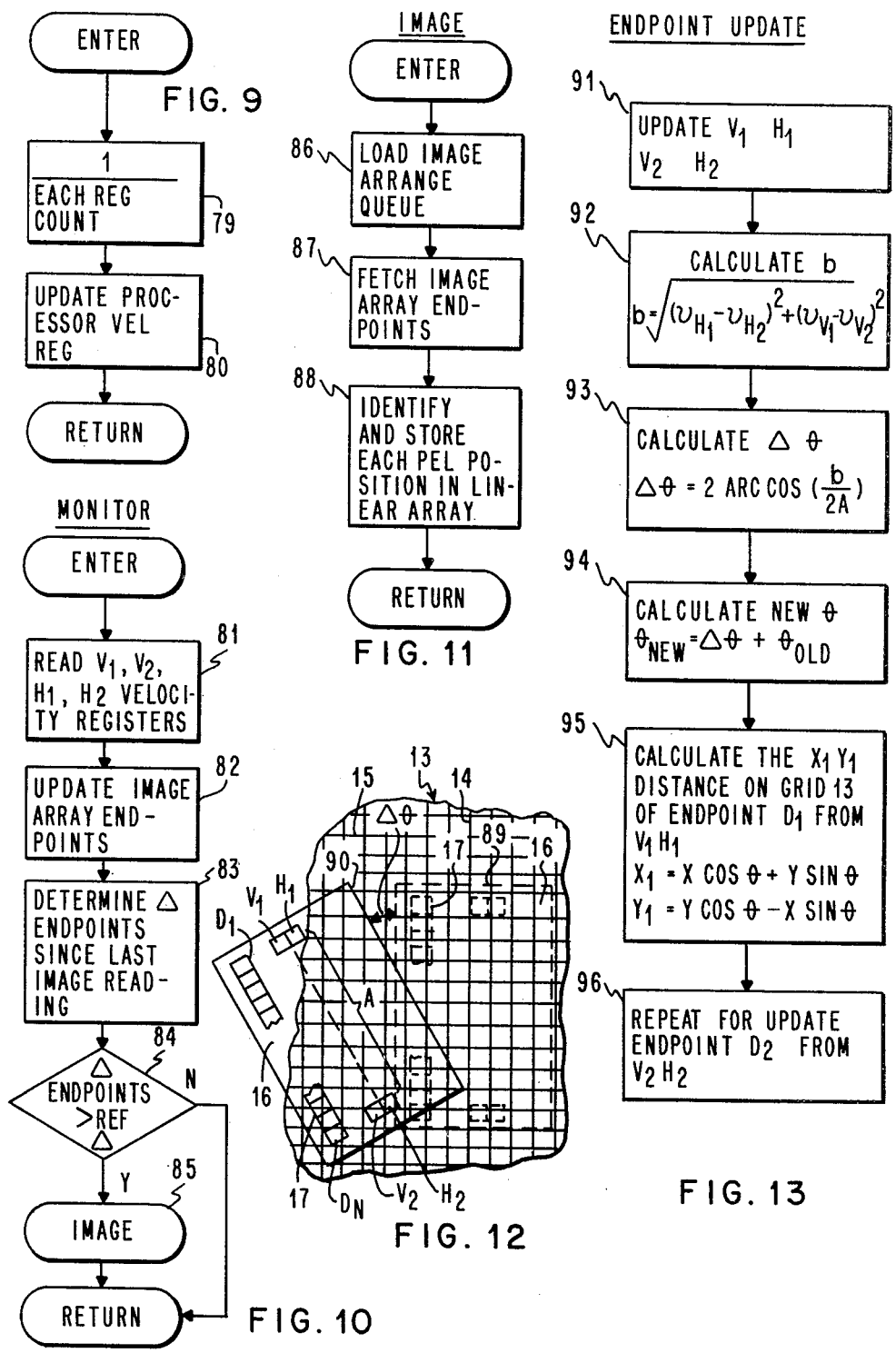

APPARATUS FOR SENSING NON-CODED IMAGES

BACKGROUND OF THE INVENTION

1. Field of the Invention

The present invention relates to text processing and editing systems and more particularly to apparatus for sensing non-coded information such as diagrams and graphs contained in the text being processed.

2. Description of the Prior Art

In office systems having text processing capability wherein the text material being developed or edited is first shown on an editing display on which it is corrected and finalized before the system reduces material to hard copy, there is a need for simple and efficient expedient for introducing non-coded information such as graphs and diagrams into the display and for storing such graphic material so that it is available for introduction into the final hard copy.

Presently available apparatus for sensing such non-coded graphic data is slow, mechanically complex and expensive. It usually involves a linear array of hundreds of light sensitive members and means of scanning the graphic material line by line in a raster fashion by a scanning lens which focuses the image onto the linear array. It further requires extensive memory storage and accessing capacity for handling the sensed graphic material. Alternatively, the document may be loaded onto a cylindrical drum which rotates while a single photodetector travels parallel to the axis of rotation. In this manner the detector traces a helix on the drum and a raster scan on the document. While such standard apparatus may be adequate when sensing entire pages made up only of non-coded graphic data such as images, it has often been found to be too large, cumbersome and costly for applications wherein non-coded graphic information only occupies a portion of a page or document which shares with standard coded alphanumeric text material.

While hand-held scanners have been used for the scanning and sensing of simple coded information, so far as can be determined, they have not been used for the sensing of non-coded information in any form. U.S. Pat. Nos. 3,947,817 and 3,976,973 relate to character recognition systems wherein coded information is read by the hand-held scanner, and the characters represented by such code may be subsequently generated. The hand-held scanners in these patents contain means for sensing deviations in linear direction of the scanner movement. However, they contain no means for velocity determination.

U.S. Pat. No. 3,963,901 also involves a hand-held scanner having means for sensing deviation from linear scan paths. It too is concerned only with the sensing of coded information and in no way contains means for making velocity determination.

It appears that one of the primary reasons that hand-held scanners have not been used in the past to scan non-coded information is that they are inherently incapable of any regular motion. In the sensing and reproduction of non-coded, i.e., graphic information, if there is no regular motion, there is no way of spatially orienting non-coded information sensed by a hand-held scanner.

BRIEF DESCRIPTION OF THE PRESENT INVENTION

The present invention satisfies these prior art needs by providing apparatus implementable in a hand-held scanner which has the capability of readily accessing portions of alphanumeric text pages containing graphic information and sensing this graphic information for storage and reproduction. The operator may merely run the hand-held scanner over the material to be sensed and introduced into a text processing system without regard to movement of the scanner in straight lines or regular patterns. The present scanner apparatus comprises a group of light sensitive elements for sensing the light patterns of the graphic images as the scanner is moved across these images. In addition, because a hand-held scanner is incapable of any regular motion, the present invention provides means for sensing the velocity of the scanner. This is accomplished by sensing the movement of a pair of points on the scanner relative to one set of ordinates in an X-Y reference grid and sensing the movement of at least one point on the scanner relative to the other ordinates on said reference grid. With this information deviation from straight line translations and the rotational component of the movement may be readily determined as well as the scanning velocities in both the translational and rotational directions.

The velocity sensing means of the present invention comprise an X-Y coordinate reference grid, means for sensing the rectilinear components of movement with first and second positions on the scanner with respect to the X lines in the grid and means for sensing the rectilinear components of movement of a second position on said scanner with respect to the Y lines in the grid. By thus determining the rectilinear components of movement of these three points with reference to their respective coordinate axes, the rotational component of movement may also be determined. More specifically, the scanning apparatus of the present invention comprises traversing means for scanning the substrate and an X-Y coordinate reference grid positioned between these traversing means and the substrate comprising X lines of a first color and Y lines of a second color. Means for sensing the rectilinear components of movement of a first position on said traversing means with respect to the X lines comprise the combination of first photosensitive means affixed to the first position on the traversing means in combination with a band pass filter which only passes light of the firstcolor to the first photosensitive means, i.e., the first photosensitive means can only detect the X lines. Similarly, the means for sensing the rectilinear components of movement of the second position on the traversing means with respect to the Y lines comprises second photosensitive means fixed to the second position in combination with a second band pass filter which only passes light of the second color, i.e., the second photosensitive means can only sense the Y lines in the grid. The actual image on the substrate is sensed by a group of light sensitive members fixed to the traversing means. These light sensitive members each comprise photosensitive element in combination with band stop filters which prevent the passage of both the first and second color to the photosensitive sensing means, i.e., image detecting member will not detect either the X or Y lines in the grid.

The apparatus further includes means for sensing the movement of a third position on the traversing means with respect to the X lines in the grid which comprises third photosensitive means fixed to the traversing means at this third position in combination with a third band pass filter which again only passes light of the first color, i.e., the color of the X axis to the third photosensitive means. As previously stated by thus determining the rectilinear components of movement of these three points with reference to their respective coordinate axis, the rotational component of movement of the scanner may also inherently be determined.

BRIEF DESCRIPTION OF THE DRAWINGS

Referring now to the drawings, wherein a preferred embodiment of the invention is illustrated, and wherein like reference numerals are used throughout to designate like parts;

FIG. 9 is a flow chart of the program for determining the velocity for each of the photoconductors.

FIG. 10 is a flow chart of the program for controlling the periodic reading of the image linear photosensitive array on the scanner.

FIG. 11 is a flow chart for the program used in conjunction with the program of FIG. 10 for determining and storing the exact position for each image pel in the linear array being read.

FIG. 12 is a diagrammatic top view showing the face of the hand-held scanner of the type shown in FIG. 2 after the scanner has had some rotation during a given movement.

FIG. 13 is a flow chart of the program for determining image array end point for the scanner of FIG. 12.

DETAILED DESCRIPTION OF THE PREFERRED EMBODIMENT

Figure 1:
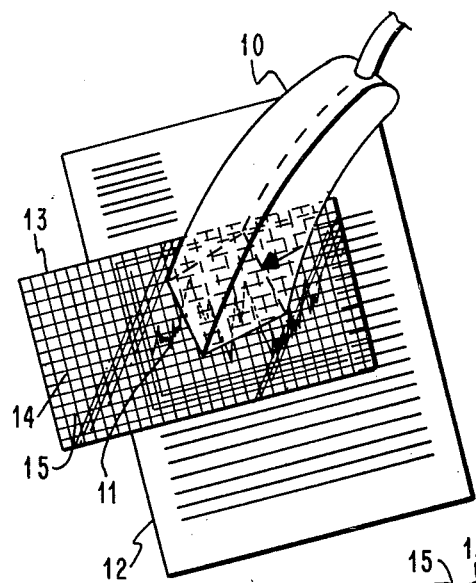
FIG. 1 is a diagrammatic overview showing the relationship of the scanner of the present invention with respect to the graphic material being scanned.

With reference to FIG. 1, the hand-held scanner 10 in accordance with the present invention will be illustrated in an operation wherein it senses non-coded graphic data 11 on a page 12 which may contain associated alphanumeric data. A grid 13 containing X ordinates 14 and Y ordinates 15 is interposed between the scanner 10 and the page 12 at a fixed position with respect to diagrammatic data 11.

Figure 2:
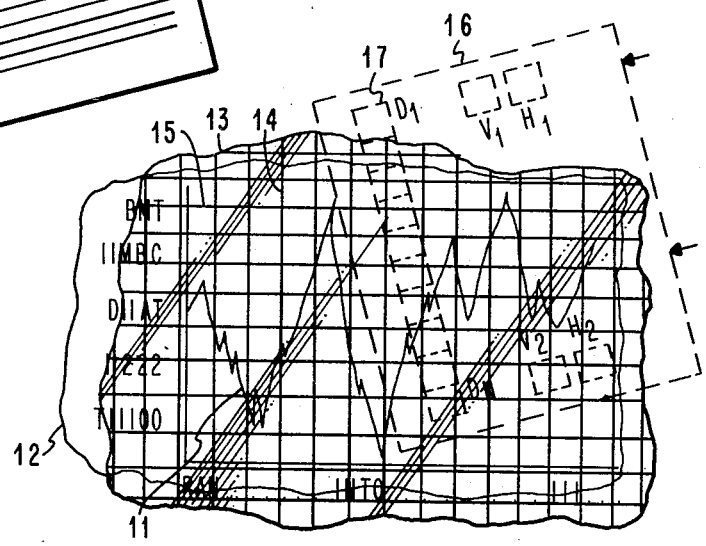
FIG. 2 is a diagrammatic top view showing the face of the hand-held scanner in a first position with respect to the graphic non-coded data being scanned.

The operation of the present invention may be better understood with reference to FIG. 2 which shows an enlarged view of the portion of the page 12 containing the graphic data 11 with a portion of grid 13 superimposed thereupon, and the planar face 16 of the hand-held scanner 10 is shown superimposed upon the planar page 12 in phantom lines in order to more clearly show the relationship of the component parts in the scanner face 16 with respect to the graphic data 11 and the grid 13 as the scanner traverses the graphic data in the direction shown by the arrows. Scanner face 16 contains a linear array of photosensitive units $D_1$ through $D_N$. For convenience in illustration, linear array has been shown to contain about a dozen of these photosensitive units. In actuality, the line of units on the face of the scanner would be from one to two inches in length and contain several hundred of these photosensitive units. As will be hereinafter described in greater detail, this linear array 17 of photosensitive units $D_1$ through $D_N$ will sense graphic data 11 as the scanner face 16 traverses the graphic data.

In addition, scanner face 16 contains photosensors $V_1$ and $V_2$ mounted at fixed positions thereon and photosensors $H_1$ and $H_2$ also mounted at fixed positions thereon.

Photosensors $V_1$ and $V_2$ are only capable of sensing Y ordinates or lines in grid 13 while photosensors $H_1$ and $H_2$ are only capable of sensing X ordinates or lines 14 in grid 13. While photosensors $V_1$ and $H_1$ and $V_2$ and $H_2$ are shown at positions spaced from each other in the drawing, for best results, it would be desirable that $V_1$ abut $H_1$ and that $V_2$ abut $H_2$ so that they are respectively substantially at the same position.

In operation, grid 13 must remain in a fixed position with respect to graphic material 11 irrespective of the movement of hand-held scanner face 16. Conveniently, the grid may be formed on a transparent glass or plastic member under which page 12 containing graphic data 11 is maintained during the scanning operation.

As will be described hereinafter in greater detail, Y lines 15 in grid 13 are of one color, e.g., red and X lines 14 are of another color, e.g., blue. In order to sense only the red lines, photosensors $V_1$ and $V_2$ have associated therewith band pass filters which pass only red color. Likewise, photosensors $H_1$ and $H_2$ have associated therewith filters which pass only blue light in order that they may sense blue lines 14. In order that linear photosensitive unit array 17 have the capability of sensing only graphic data 11 without being affected by X lines 14 or Y lines 15 as indicated hereinafter, each photosensitive unit $D_1$ through $D_N$ has an associated band stop filter which prevents the passage of either red or blue light.

Figure 3:
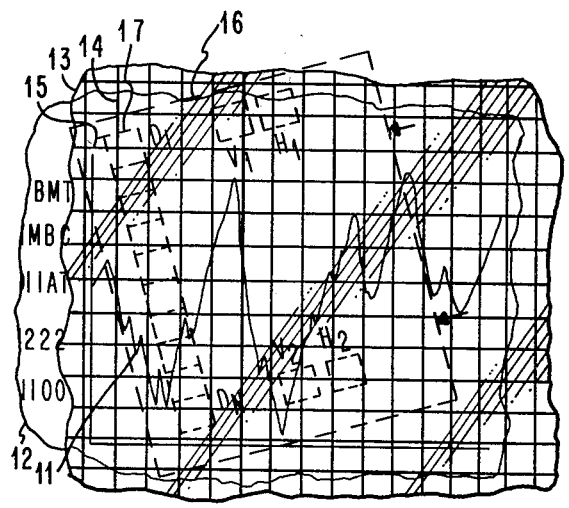
FIG. 3 is the same view as FIG. 2 except that the planar face of the scanner is in a second position.

With reference to FIG. 3, the face of the hand-held scanner 16 has not traversed a graphic data 11 for a substantial distance as shown and photoconductors $V_1$ and $V_2$ have crossed a plurality of Y lines 15 while photoconductors $H_1$ and $H_2$ have crossed a plurality of X lines 14. At the same time, of course, linear photosensitive array 17 has crossed a substantial portion of graphic data 11.

Figure 4:
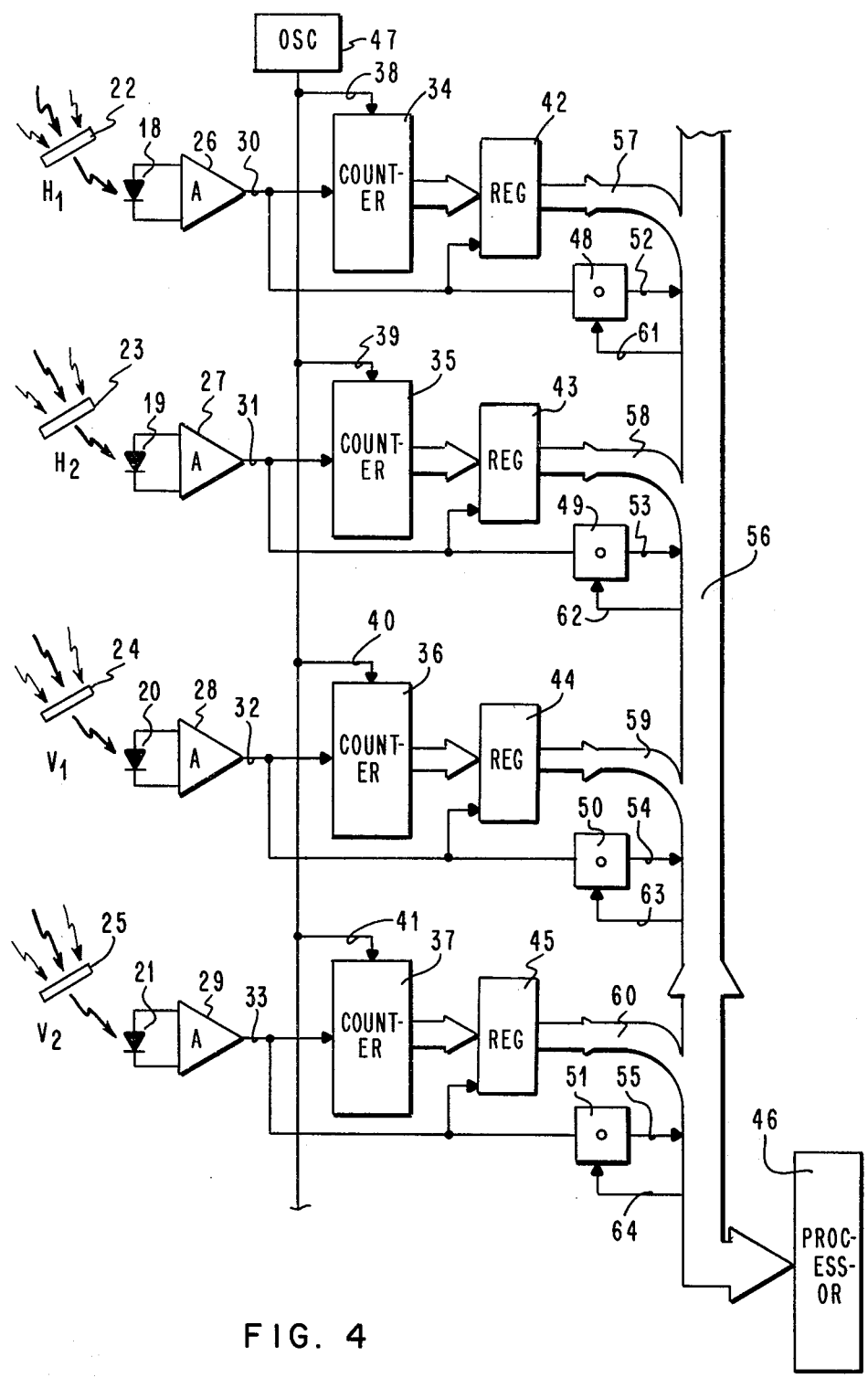
FIG. 4 is a schematic view of the circuitry for correlating the information obtained from the grid sensing photoconductors with a processor.

Now with reference to FIG. 4, let us first consider how the grid lines respectively sensed by photoconductors $H_1$, $H_2$, $V_1$ and $V_2$ are sensed and forwarded to the processor. $H_1$, $H_2$, $V_1$ and $V_2$ photoconductors each respectively comprise a photosensitive diode 18, 19, 20, and 21. Monochromatic band pass filters 22 and 23 respectively associated with photodiodes 18 and 19 pass only blue light. Thus, photosensors 18 and 19 will generate current only when the respective $H_1$ or $H_2$ photosensitive unit on scanner face 16 crosses a blue Y line 14 in grid 13 (FIG. 2). Similarly, since band pass filters 24 and 25 pass only red light, photosensitive diodes 20 and 21 will respectively generate current only when photosensitive units $V_1$ and $V_2$ cross a Y line 15 in grid 13 (FIG. 2). The photosensitive states of diodes 18 through 21 will respectively be amplified through amplifiers 26 through 29 and appear as output signals on lines 30 through 33 respectively.

During the operation of the scanner, counters 34 through 37 are regularly incremented through respective inputs 38 through 41 from oscillator 47 at repetitive regular time increments. Each counter 34 through 37 has an associated register 42 through 45 into which the count from the associated counter may be loaded and held or buffered until the count is transmitted to the central controlling processor 46. In the operation of the circuitry being described, each of the four counters 34 through 37 is incremented by oscillator 47 to provide the timing. When each X or Y line in the grid is crossed by a $V_1$, $V_2$, $H_1$ or $H_2$ photosensitive unit capable of sensing it, the appropriate color is passed through filters 22 through 25 and activates the appropriate photosensitive diodes 18 through 21. This will result in a signal on one of the lines 30 through 33. Such a signal will be input to the respective counters 34 through 37 and to the associated registers 42 through 45 to cause the count in the counter at the time the particular grid line is crossed to be loaded into and stored in the associated register 42 through 45 and to reset the counter so that a new count can commence of the pulses being fed to the respective counter from oscillator 47 over lines 38 through 41. The count loaded into the associated register 42 through 45 represents a count from the crossing of the last previous grid line by the particular photoconductor unit $H_1$, $H_2$, $V_1$ and $V_2$ until the present crossing. Accordingly, this count is representative of one of the orthogonal components of the velocity of the particular photosensitive unit from either one Y line to the next or one X line to the next. Simultaneously with the loading of the count into the respective register 42 through 45, the signal on the respective output line 30 through 33 will be input to an associated flag 48 through 51. When a respective flag is "up" indicating that there is a count in its associated buffer register 42 through 45, an output signal from the respective flag on one of output line 52 through 55 will be transmitted to processor 46 via input/output bus 56. When the processor is ready, it will then receive the output of the particular loaded register 42 through 45 respectively over bus 57 through 60 into I/O bus 56. At the same time the processor will reset the appropriate flag 48 through 51 by a reset signal on line 61 through 64.

Figures 5, 6:
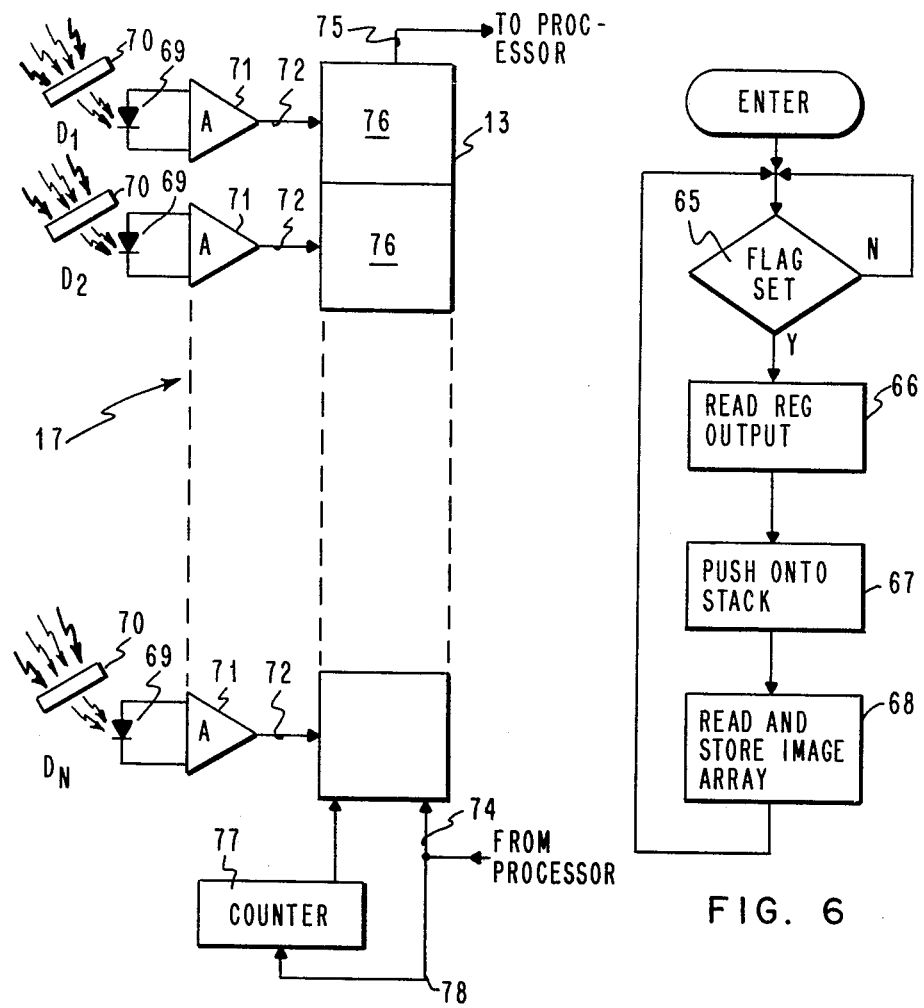
FIG. 5 is a schematic circuit diagram of the circuitry required to sense the image and to forward the sensed image data to the processor.
FIG. 6 is a flow chart of the program controlling the input of the data sensed in the grid sensor circuit of FIG. 4 to the processor.

The flow chart for the processor routine involved in transferring the information stored in registers 42 through 45 is shown in generalized form in FIG. 6. The processor repetitively scans each of flags 48 through 51 (FIG. 6), decision block 65; when a flag is set, its associated output register is read into the processor, block 66. In the processor it is placed onto a sequential stack, block 67 which stores the counts between either X or Y lines crossing for each of photoconductor units $H_1$, $H_2$, $V_1$ and $V_2$ (block 67).

As indicated by block 68, each time one of the photoconductive units $V_1$, $V_2$, $H_1$ and $H_2$ crosses a respective horizontal or vertical line, as indicated by a count in one of the registers 42 through 45, the processor initiates a procedure whereby the linear image array of photosensitive units $D_1$ through $D_N$ (FIGS. 2 and 3) is read to provide an indication of that portion of graphic data 11 being crossed by linear image array 17 at the point that one of the photoconductors $V_1$, $V_2$, $H_1$ and $H_2$ is crossing an X or Y line.

It should be noted that while in the particular embodiment of the present invention the linear image array 17 is read upon each crossing of an X or Y line, this procedure is not critical, i.e., the image array may be read at different intervals either more or less frequent dependent upon the nature of the graphic data 11 being sensed as well as the quality of the image of the graphic data 11 which is to be subsequently reproduced by the text processing system. In any event, with reference to FIGS. 5 and 6, the reading of linear image array 17 will now be described.

With reference to FIG. 5, each photosensitive unit $D_1$ through $D_N$, in linear image sensing array 17 comprises a photosensitive diode 69 and a band stop filter 70. The band stop filters 70 prevent the passage of red and blue light so that the photosensive units $D_1$ through $D_N$ are incapable of being affected by either the red or blue lines in reference grid 13 (FIG. 2). Thus, at a particular instance in the movement of scanner face 16 (FIGS. 2 and 3) across graphic data 11, a line in the graphic data 11 crosses or optionaly fails to cross the photosensitive unit $D_1$ through $D_N$, the diode 69 will generate current and a signal will be amplified through amplifier 71 and appear on the respective output line 72. The status of each particular output line 72, i.e., either up or down will be stored in an associated unit position in output register 73. Thus, when the processor is ready to read the image array at a particular point in time, a signal will be input on line 74 to unload register 73 serially back to the processor along output line 75. Since the output along line 75 from register 73 is serial and register 73 may have in the order of several hundred unit positions 76 representing each of the several hundred possible photosenstive units $D_1$–$D_N$, a counter 77 is provided which receives the same read signal from the processor along line 78 and increments the register 73 through an increment count corresponding to the number of register units 76 to provide the serial readout back to the processor along line 75.

By the operations thus described, we now have stored in the processor 46 a velocity record in counts of oscillator 47 for the movement of photoconductors $H_1$ and $H_2$ between a known pair of X lines in reference grid 13 and a similar record for photoconductors $V_1$ and $V_2$ cross a known pair of Y lines 15 in grid 13. In addition, there is stored in the processor representations of that portion of graphic data image 11 being traversed by linear image array 17 at each of the crossings of X lines 14 and Y lines 15 respectively by photoconductors $H_1$, $H_2$, and $V_1$, $V_2$.

Figure 7:
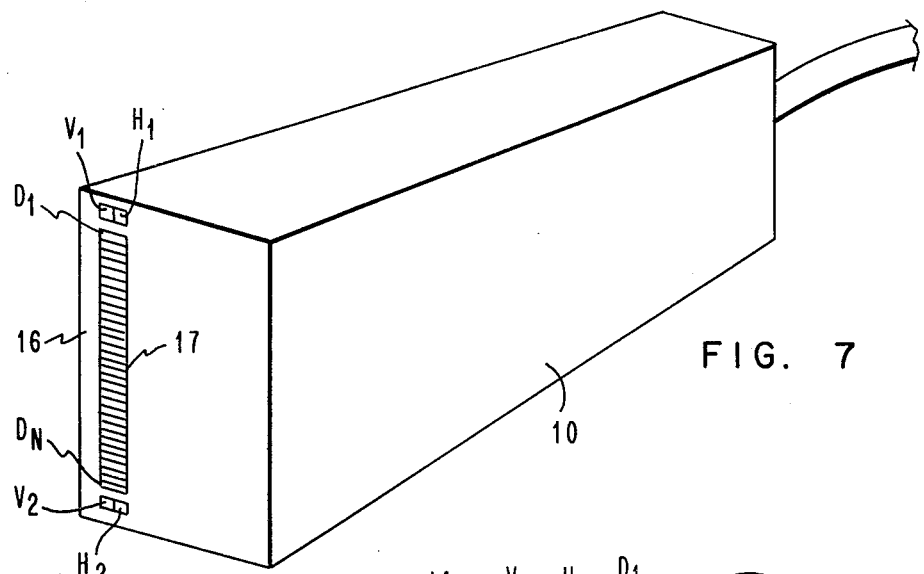
FIG. 7 is a diagrammatic view of a scanner showing a convenient arrangement of photosensor and photoconductive elements.
Figure 8:
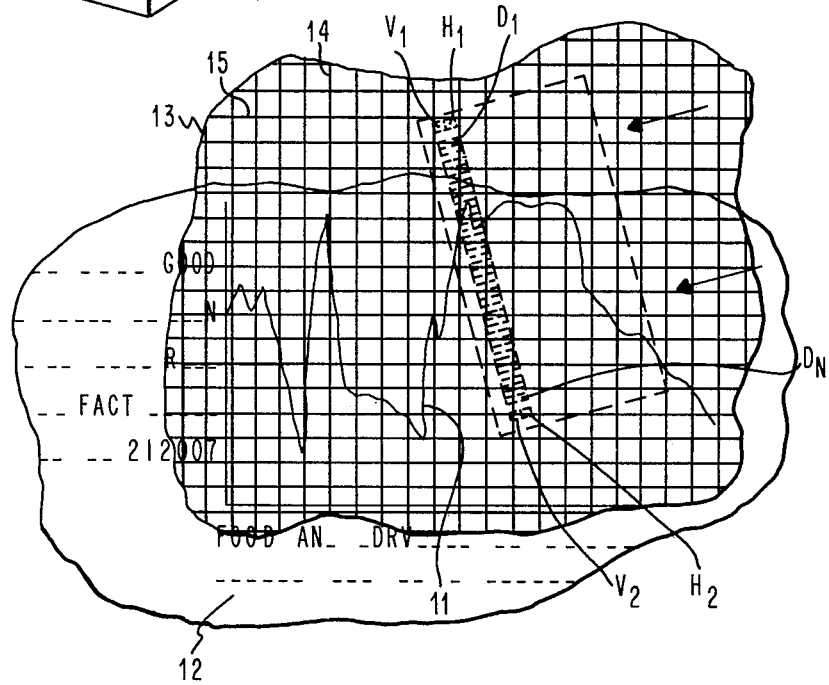
FIG. 8 is a diagrammatic top view showing the face of a hand-held scanner of FIG. 7 with respect to graphic non-coded data being scanned.

Before describing how the processor handles the information sent through the various photosensitive elements, there will be described with respect to FIGS. 7 and 8 a very convenient arrangement on the face 16 of scanner 10 of the positions of photoconductors $V_1$, $V_2$, $H_1$ and $H_2$ with respect to the linear photoconductor image array 17. As shown in FIG. 7, photoconductors $V_1$ and $H_1$ abut each other and photoconductors $V_2$ and $H_2$ abut each other and both of these pairs are in substantially the same line as linear array 17. As will be seen subsequently in greater detail, with this arrangement, once the relative velocities of the $V_1$, $H_1$, $V_2$ and $H_2$ are determined, a standard algorithm may be utilized to determine the exact position of each of the photosensitive units $D_1$ through $D_N$ at a particular point in time, e.g., the position shown in FIG. 8 when the image array is sensing or reading graphic data 11. The illustration of FIG. 8 is essentially the same as that of FIGS. 2 or 3 except for different positioning of photoconductors $V_1$, $H_1$, $V_2$ and $H_2$ with respect to the linear array 17.

With reference to FIGS. 9, 10 and 11, the operation of processor 46 in the practice of the present invention will be described. As previously described with respect to FIG. 4, at some interval the data in registers 42, 43, 44, and 45 respresentative of the counts between the respective pairs of grid lines traversed by either $V_1$, $V_2$, $H_1$ and $H_2$ will be stored in the processor. The processor will take the reciprocal of each of the latest register count (block 79) and store the same in the respective velocity register maintained in the processor for each of photoconductors $V_1$, $V_2$, $H_1$ and $H_2$ (block 80, FIG. 9).

At regular intervals determined by a clock in processor 46, the processor goes through a "monitor" routine (FIG. 10) to determine whether the image is ready to be read. First, block 81, the computer reads the updated velocity registers for photodiodes $V_1$, $V_2$, $H_1$ and $H_2$. Then, it updates the end points of linear image array 17 (block 82). Where the scanner has the simplified embodiment shown in FIGS. 7 and 8 in which the photoconductor abutting pairs $V_1$, $H_1$, and $V_2$, $H_2$ are at opposite ends of linear array 17, the position of the two diodes of pairs respectively serve as the required end points. In such a case, the coordinate values of the respective two end points are updated merely by adding the respective values stored in the velocity register (block 80) for each of the four photoconductors to the previous end point value. On the other hand, where as in FIGS. 2 and 3 the photoconductors $V_1$, $V_2$, $H_1$ and $H_2$ are not paired and positioned at the ends of the linear array 17, then, photosensitive units $D_1$ and $D_N$ at opposite ends of the array serve as the end points and the updating is somewhat more complex. The updating of such a case is described in greater detail hereinafter with respect to FIGS. 12 and 13.

In any event, once the coordinates of the end points have been determined, irrespective of the method, the change in end points since the last image reading is then determined (block 83), and this change in end point is compared to a minimum reference change in end point (decision block 84). This reference represents the minimum change in position of the array which will warrant a sensing of the graphic image 11 by linear array 17. If the change in end point is insufficient, the monitor routine will return to be repeated again. On the other hand if the change in end point exceeds the minimum required, the computer will now exercise the image routine block 85 in order to sense the image.

Now with reference to FIG. 11, the image reading routine will be described. First, as indicated in block 86, the processor sends appropriate signals along lines 74 and 78 (FIG. 5) to cause a serial reading of the image output register 73 into the processor along lines 75. Then, as indicated in block 87, the image array end points determined by the monitor routine of FIG. 10, block 82, are fetched. With these end points fixed, the exact position of each of the image pels or subunits as determined by each of the photosensitive units $D_1$ through $D_N$ (FIG. 5) may be determined and recorded associated with a defined position in the graphic data 11 being read. This may be carried out using the "Dot-Approximation Algorithm" described in detail in Appendix A appearing on page 681 in "Communications of the ACM", November 1973, Vol. 16, No. 11. This algorithm sets forth a technique for determining the coordinates of each point on a line between two given end points. A substantially similar routine for accomplishing the same results may be found in the article "Algorithm for Computer Control of the Digital Plotter" by J. E. Bresenham appearing at pages 25–30 of the IBM Systems Journal, Vol. 4, No. 1, 1965.

It should be noted with respect to the monitor (FIG. 10) and image routines (FIG. 11) described that the sampling in order to determine whether the linear array 17 should be read occurs in response to a fixed periodic time signal generated within the processor. This is in effect an alternative of the procedure described hereinabove wherein the image array 17 is read each time one of the photodiodes $V_1$, $V_2$, $H_1$ and $H_2$ crossed a grid line. Either expedient is operable. However, with the approach described in FIGS. 10 and 11, there is greater control of the quality of the image of the graphic data being recorded, i.e., the readings of linear array 17 may be made more frequent if greater quality is required.

In the previous description with respect to the Monitor procedure, FIG. 10, the updating of the image array end points was provided with respect to the simplified scanner embodiment of FIGS. 7 and 8. At that point it was indicated that where the $V_1$, $H_1$ and $V_2$, $H_2$ pairs are not at the ends of the linear array 17, then photosensitive units $D_1$ and $D_N$ in the linear array 17 would serve as the end points, and the updating of these end points would be somewhat more complex. This embodiment will now be described with respect to FIGS. 12 and 13. In FIG. 12 an illustration is shown wherein the scanner 16 has been moved from position 89 shown in dotted lines to postion 90 and an updating of array and points $D_1$ and $D_N$ must be made. In making this movement, the scanner face 16 has been rotated to the extent shown. For convenience in illustration the graphic material which is being scanned is not shown, but we shall assume that graphic material being scanned is of the same nature as that shown in FIGS. 2 and 3.

The routine for the end point update is shown in FIG. 13 for the movement shown in FIG. 12. First, block 91, the $V_1$, $H_1$ and $V_2$, $H_2$ photosensitive pairs are updated in the manner described above for block 82 (FIG. 10) by adding the values stored in the velocity registers (block 81) for $V_1$, $H_1$, $V_2$, and $H_2$ to the previous $V_1$, $H_1$, $V_2$, and $H_2$ values. Next, block 92, a constant b is calculated; b is a factor which varies with the extent of rotation and is determined by the formula:

$$b = \sqrt{(v_{H1} - v_{H2})^2 + (v_{V1} - v_{V2})^2}$$

as indicated, b is determined by the four updated velocities $v_{H1}$, $v_{H2}$, $v_{V1}$, and $v_{V2}$ in the velocity registers (block 81). Next, block 93, $\Delta\theta$ is calculated. $\Delta\Gamma$ which is shown in FIG. 12 is the extent of rotation of the scanner face 16 during the movement from the initial position 89 to present position 90. It is based upon rotational factor b calculated above and the constant factor A which as shown in FIG. 12 is the fixed distance between photoconductor pairs $V_1$, $H_1$ and $V_2$, $H_2$.

Then, block 94, the present cumulative rotation from the beginning of the scan operation until the present step is calculated as the New $\theta$. As set forth, the New $\theta$ is merely the $\Delta\theta$ of the step shown plus the previous cumulative extent of rotation of the scanner face 16 from the original position at the start of the scan which is assumed to have linear array 17 parallel to Y ordinates 15.

Having thus calculated the new cumulative extent of rotation $\theta$, now the xy distance with respect to orientation grid 13 of end point $D_1$ from diode pair $V_1$, $H_1$ is calculated, block 95. This is accomplished through the two equations for $x_1$ and $y_1$:

$$x_1 = x \cos \theta + y \sin \theta; \quad y_1 = y \cos \theta - x \sin \theta,$$

where x,y are the original coordinate distance of photosensitive unit $D_1$ from photoconductive pair $V_1$, $H_1$ which is, of course, fixed on the scanner face 16. The value $x_1$, $y_1$ are the coordinate distances of photosensitive $D_1$ from photosensitive pair $V_1$, $H_1$ on grid 13. Since coordinate position of $V_1$, $H_1$ has already been updated, block 91, the updated coordinate position of $D_1$ is now known.

Following substantially the same routine, block 96, end point $D_2$ may be updated based upon the updated position of diode pair $V_2$, $H_2$ (as calculated block 91 above).

Having now updated the positions of end points $D_1$ and $D_N$ the routine set forth in FIG. 11 commencing with block 87 may be followed through using $D_1$ and $D_N$ as the end points.

While the invention has been particularly shown and described with reference to a preferred embodiment it will be understood by those skilled in the art that various other changes in form and detail may be made without departing from the spirit and scope of the invention.

What is claimed is:

1. A hand-held scanner for sensing non-coded images on a substrate comprising
    a group of light sensitive elements for sensing the light patterns of said images as the scanner is moved across said substrate, and
    means for sensing the translational velocity and rotation of said scanner.

2. The scanner of claim 1 wherein said velocity sensing means comprises
    an X-Y coordinate reference grid,
    means for sensing the rectilinear components of movement of a first position on said scanner with respect to the X lines in said grid, and
    means for sensing the rectilinear component of movement of a second position with respect to the Y lines in said grid.

3. The scanner of claim 2 further including
    means for sensing the rectilinear component of movement of a third position on said scanner with respect to one set of said coordinate axes of said grid.

4. The scanner of claim 3 further including
    means for sensing the rectilinear component of movement of a fourth position on said scanner with respect to the other set of said coordinate axes.

5. The scanner of claim 4 wherein at least said first and second positions are adjacent to each other.

6. The scanner of claim 2 wherein
    said reference grid is superimposed over at least part of said image and the X lines in said grid are of a first color and the Y lines in said grid are of a second color,
    said means for sensing the movement of said first position with respect to said X lines comprises
    first photoconductive means fixed to said scanner at said first position, and
    a first monochromatic band pass filter passing only light of said first color to said first photoconductive means, and
    said means for sensing the movement of said second position with respect to said Y lines comprises
    second photoconductive means fixed to said scanner at said second position, and
    a second monochromatic band pass filter passing only light of said second color to said second photoconductive means.

7. The scanner of claim 6 wherein
    said light sensitive elements for sensing said images comprise a group of photoconductive elements and band stop filters preventing the passage of said first and second colors to said group of photoconductive elements.

8. The scanner of claim 7 further including
    means for sensing the movement of a third position on said scanner with respect to said X lines comprising
    third photoconductive means fixed to said scanner at said third position, and
    a third monochromatic band pass filter passing only light of said first color to said third photoconductive means.

9. The scanner of claim 8 further including
    means for sensing the movement of a fourth position on said scanner with respect to said Y lines comparing
    fourth photoconductive means fixed to said scanner at said fourth position, and
    a fourth monochromatic band pass filter passing only light of said second color to said fourth photoconductive means.

10. The scanner of claim 9 wherein at least said first and second positions are adjaceent to each other.

11. Apparatus for sensing non-coded images on a substrate comprising
    means for traversing said substrate,
    a X-Y coordinate reference grid positioned between said traversing means and said substrate comprising X lines of a first color and Y lines of a second color,
    means for sensing the rectilinear components of movement of a first position on said traversing means with respect to said X lines comprising
    first photoconductive means fixed to said traversing means at said first position, and
    a first monochromatic band pass filter passing only light of said first color to said first photoconductive means,
    means for sensing the rectilinear components of movement of a second position on said traversing means with respect to said Y lines comprising
    second photoconductive means fixed to said traversing means at said second position, and
    a second monochromatic band pass filter passing only light of said second color to said second photoconductive means, and
    a group of light sensitive members fixed said traversing means for sensing said image as said substrate is traversed comprising a group of photoconductive elements and band stop filters preventing the passage of said first and second color to said group of photoconductive elements.

12. The scanning apparatus of claim 11 further including
    means for sensing the movement of a third position on said traversing means with respect to said X lines comprising third photoconductive means fixed to said traversing means at said third position, and a third monochromatic band pass filter passing only light of said first color to said third photoconductive means.

13. The scanner of claim 12 further including means for sensing the movement of a fourth position on said traversing means with respect to said Y lines comparing fourth photoconductive means fixed to said traversing means at said fourth position, and a fourth monochromatic band pass filter passing only light of said second color to said fourth photoconductive means.

14. The scanner of claim 13 wherein at least said first and second positions are adjacent to each other.

* * * * *